United States Patent [19]

Dawson et al.

[11] 4,001,774

[45] Jan. 4, 1977

[54] METHOD OF TRANSMITTING SIGNALS FROM A DRILL BIT TO THE SURFACE

[75] Inventors: Charles R. Dawson; Richard J. Kostelnicek, both of Houston, Tex.

[73] Assignee: Exxon Production Research Company, Houston, Tex.

[22] Filed: Jan. 8, 1975

[21] Appl. No.: 539,361

[52] U.S. Cl. .................. 340/18 LD; 340/18 CM; 346/33 WL; 175/50; 174/47; 324/10
[51] Int. Cl.[2] .................. G01V 1/40; G01V 1/22; E21B 47/12
[58] Field of Search ............... 340/15.5 TS, 18 LD, 340/18 CM; 346/33 WL; 175/50; 324/.5 G, 5, 10; 174/47; 339/16

[56] References Cited

UNITED STATES PATENTS

| | | | |
|---|---|---|---|
| 2,096,359 | 10/1937 | Hawthorn | 340/18 CM |
| 2,414,719 | 1/1947 | Cloud | 340/18 LD |
| 2,478,133 | 8/1949 | Shanklin | 343/719 |
| 2,507,351 | 5/1950 | Scherbatskoy | 174/47 |
| 2,957,159 | 10/1960 | Fitchette | 340/18 LD |
| 3,209,323 | 9/1965 | Grossman | 340/18 LD |
| 3,629,937 | 12/1971 | Fredriksson | 343/719 |
| 3,807,502 | 4/1974 | Heilhecker et al. | 174/47 |
| 3,829,767 | 8/1974 | Delogne | 343/719 |
| 3,905,010 | 9/1975 | Fitzpatrick | 340/18 R |

*Primary Examiner*—Nelson Muskowitz
*Attorney, Agent, or Firm*—E. Eugene Thigpen

[57] ABSTRACT

A system for performing wellbore telemetry operations wherein a communication link between a subsurface location in a well and the location substantially at the surface is established and maintained through electromagnetic coupling between two insulated electric conductors. The first conductor is electrically coupled to a transmitter, normally located at the subsurface location, and extends upwardly in the well. The second conductor is electrically coupled to a receiver, normally at the surface location, and extends down into the well. Normally, the two conductors will overlap along a substantial portion of the lengths thereof. As the well is drilled deeper and the drill string is lengthened, the transmitter and the first conductor follow the progression of the wellbore into the earth, thereby reducing the overlap between the first and second conductors. When the two conductors cease to overlap, the second conductor may be lengthened to re-establish the overlap.

20 Claims, 6 Drawing Figures

METHOD OF TRANSMITTING SIGNALS FROM A DRILL BIT TO THE SURFACE

BACKGROUND OF THE INVENTION

1. Field of the Invention

This invention relates to an improved method and apparatus for performing wellbore telemetry operations. In one aspect, it relates to a method for establishing and maintaining a communication link between a subsurface location in a rotary drill string and a surface location.

2. Description of the Prior Art

In the drilling of oil wells, gas wells, and similar boreholes, it frequently is desirable to transmit data between subsurface and surface locations. One application where data transmission has received considerable attention in recent years is in wellbore telemetry systems designed to sense, transmit, and receive information indicative of a subsurface condition. This operation has become known in the art as "logging while drilling."

A major problem associated with wellbore telemetry systems has been that of providing reliable means for transmitting signals between the subsurface and surface locations. This problem can best be appreciated by considering the manner in which rotary drilling operations are normally performed. In conventional rotary drilling, a borehole is advanced by rotating a drill string provided with a drill bit at its lower end. Lengths of drill pipe, usually about 30 feet long, are added to the drill string, one-at-a-time, as the borehole is advanced in increments. In adapting a telemetry system to rotary drilling equipment, the means for transmitting the electric signal through the drill string must permit the connection of additional pipe lengths to the drill string as the borehole is advanced.

An early approach to the problem involved the use of continuous electric cable which was adapted to be lowered inside the drill string and to make contact with a subsurface terminal. This technique, however, required withdrawing the cable from the drill string each time a pipe length was added to the drill string. A more recent approach involves the use of special drill pipe. Each pipe section of the special pipe is provided with an electric conductor having connectors at its opposite ends. Electric continuity is maintained across the junction of two pipe sections by connectors of one section contacting a connector on the adjacent pipe section (see U.S. Pat. Nos. 3,518,608 and 3,518,609). Disadvantages of this system include the high cost of the special pipe sections, the need for a large number of electric connections (one at each joint), and the difficulty of maintaining insulation of the electric connectors at each joint.

Still another approach involves the use of cable sections mounted in each pipe section (see U.S. Pat. No. 2,748,358). The cable sections are connected together as pipe sections are added to the drill string. Each cable section is normally made slightly longer than its associated pipe section, with the result that a small amount of slack is present in the conductor string at all times.

A more recent approach involves the use of a cable maintained in a looped configuration within the drill string. The looped arrangement stores cable in the drill string and permits the cable to be extended as the drill string is lengthened. This technique normally requires the use of sheaves and other apparatus within the drill string to maintain the cable in the looped configuration. However, this arrangement presents flow restrictions within the relatively narrow opening. Moreover, care must be exercised to prevent cable entanglement, particularly for long cable loops.

SUMMARY OF THE INVENTION

The purpose of the present invention is to provide a communication link between a subsurface location in a well and the surface.

Briefly the invention, in one embodiment, involves transmitting data from the subsurface location via an insulated conductor extending upwardly from the subsurface location and functioning as an antenna. A second insulated conductor extends downwardly from the surface and, normally, will substantially overlap the first conductor. The transmitted signal is picked up by this second conductor through electromagnetic coupling. The second conductor functions as a receiving antenna and is coupled to a receiver at the surface.

Normally, the transmitting antenna is lowered to the desired subsurface location when it is desired to begin telemetering operations and the receiving antenna is also inserted into the well at this time. Because the overlapping length of the two antennas is not critical, both antennas may initially extend substantially the entire length of the wellbore. The well can then be drilled to approximately twice its original depth before the wires cease to overlap and the communication link is lost. At that time, the length of the receiving antenna may be increased to reestablish the overlap to resume telemetering operations.

A principal advantage of this invention is that the well depth can be substantially increased and the communication link maintained without increasing the length of either conductor.

Another advantage is that the interior of the drill pipe is relatively unobstructed.

DESCRIPTION OF THE PREFERRED EMBODIMENT

Figure 1:
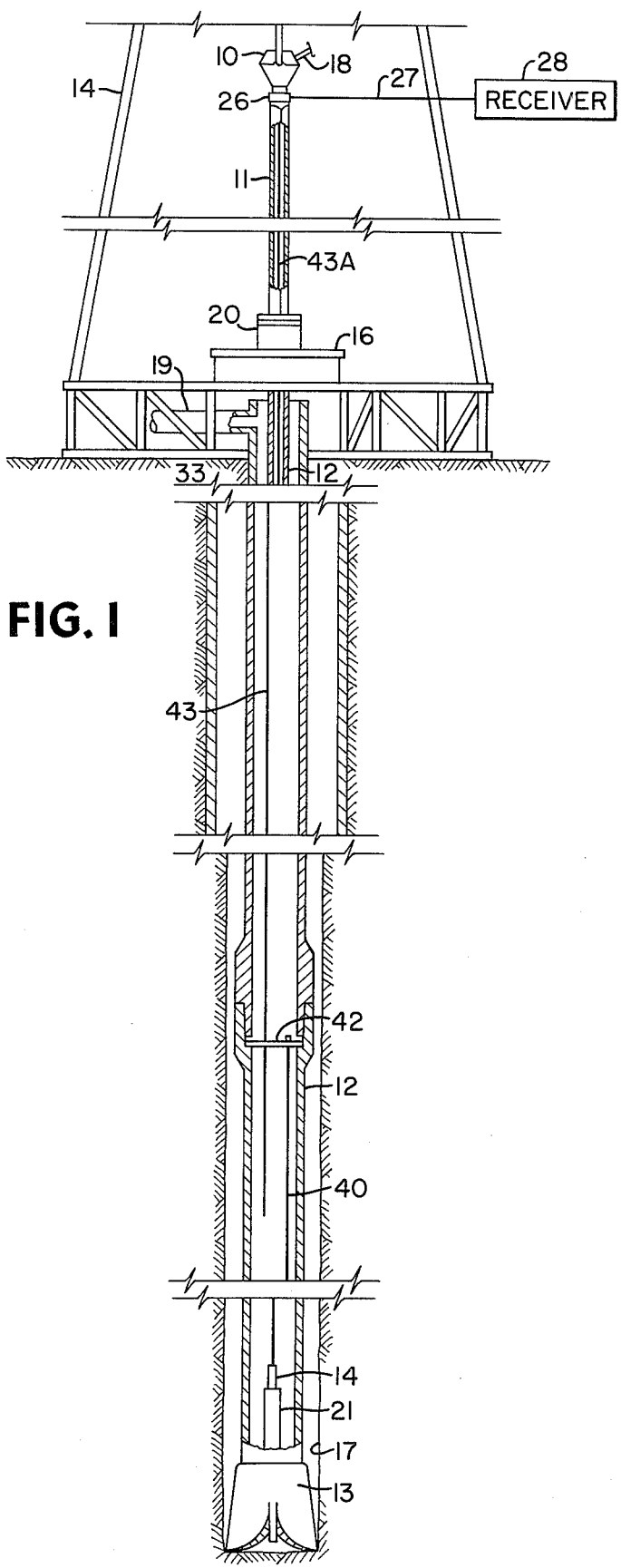
FIG. 1 is a schematic view of well drilling equipment with two electric conductors arranged within the drill string in a preferred configuration.

Conventional rotary drilling equipment, as illustrated schematically in FIG. 1, includes swivel 10, kelly 11, tubular drill string 12 and a bit 13. These components, connected in the manner illustrated, are suspended from the drilling derrick 14 by means of rig hoisting equipment. The kelly 11 passes through rotary table 16 and connects to the upper end of the drill string 12. The term "drill string" as used herein refers to the column of tubular pipe between the bit 13 and kelly 11. The major portion of the drill string 12 normally is composed of drill pipe with a lower portion being composed of drill collars. The drill string 12 consists of individual pipe sections, either drill pipe or drill collars connected together in end-to-end relation. In the lower three sections of FIG. 1, the diameters of the borehole and the drill string 12 have been expanded in relation to the upper section to reveal further details.

The borehole 17 is advanced by rotating the drill string 12 and bit 13. Drilling fluid is pumped down through the drill string 12 and up the borehole annulus. The drilling fluid is delivered to swivel 10 through a hose (not shown) attached to hose connection 18 and is returned to the surface fluid system from the borehole annulus through pipe 19. A kelly bushing 20 couples the rotary table 16 to the kelly 11 and provides means for transmitting power from the rotary table 16 to the drill string 12 and bit 13. The present invention may also be used in systems which employ a power swivel in lieu of a kelly and rotary table; for purposes of illustration, however, the invention will be described in connection with the kelly and rotary table arrangement.

As mentioned previously, it frequently is desirable to monitor a subsurface drilling condition during drilling operations. This requires measuring a physical condition at the subsurface location, transmitting the data signal to the surface, and reducing the signal to useful form. Typical situations where telemetry is applicable in drilling operations include drilling through abnormal pressure zones, drilling through zones where hole deviation is likely to be a problem, directional drilling, exploratory drilling and the like.

An instrument 21 capable of measuring a subsurface condition and generating an electrical signal indicative of or representative of that condition is provided within the drill string 12. A variety of devices capable of sensing a physical condition are available. These include transducers for measuring pressure, temperature, strain, and the like; surveying instruments for measuring hole deviation; and logging instruments for measuring resistivity or other properties of subsurface formations. The instrument 21 may normally be powered by batteries. Alternatively, a subsurface generator driven by fluid flowing through the drill string 12 may be used to power instrument 21.

The communication link between the instrument 21, located within the well, and the surface is established by transmitting the data from instrument 21 to the surface via an electromagnetic link. Normally, the data will be transmitted by encoding a train of electrical pulses and using these encoded pulses to modulate a carrier. Phase modulation may preferably be employed in the transmission link since phase modulation is relatively insensitive to noise. More than one transducer or other device may be employed in the instrument 21 if desired, in which case a multiplexer may be used for sending the various signals over a single transmission link.

Instrument 21 includes a conventional transmitter. Conductor 40 is coupled to the transmitter within instrument 21 so as to function as an antenna. This conductor wire must be electrically insulated throughout its entire length to prevent shorting out the electrical signal. Conductor 40 may be of sufficient stiffness to be self-standing within the well. Alternatively, support member 42 may be employed to support a more flexible wire.

Figure 2:
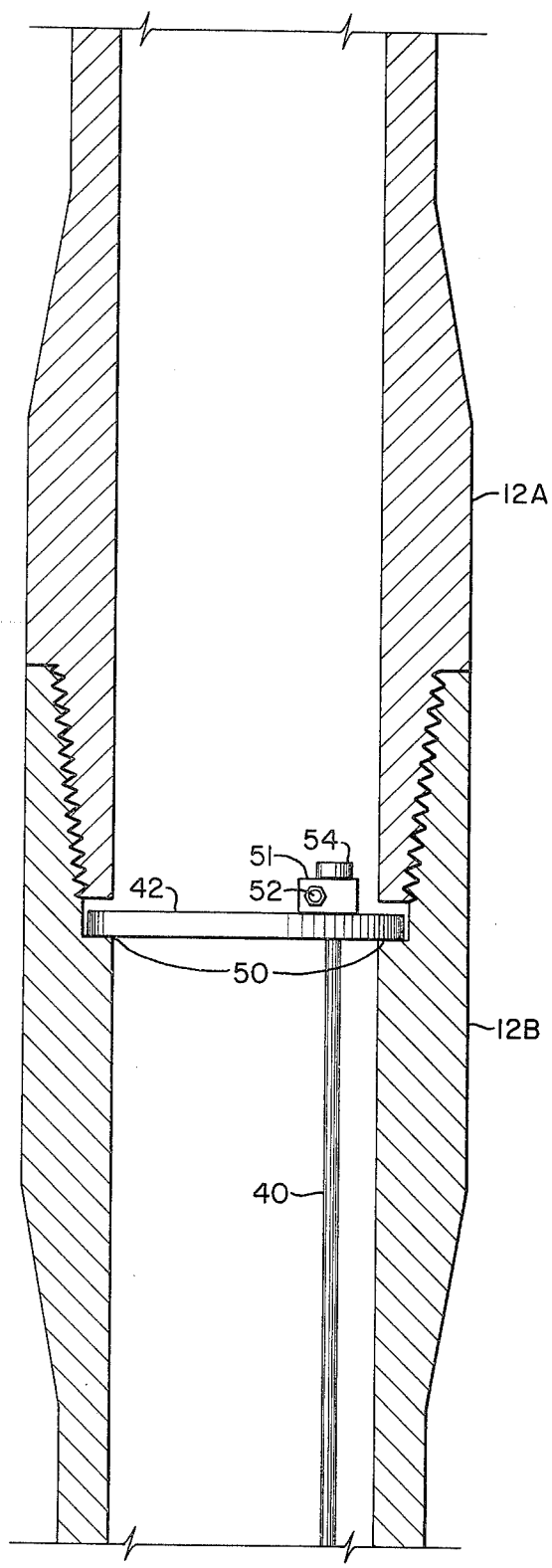
FIG. 2 is an enlarged fragmentary view, shown partially in longitudinal section, of apparatus useful in the invention for supporting the lower conductor within the drill string.
Figure 3:
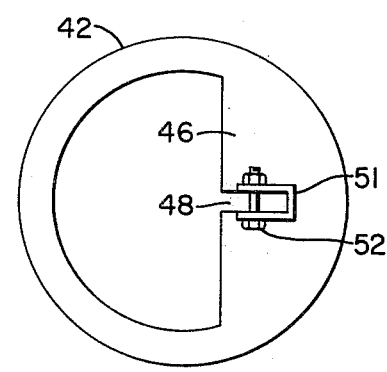
FIG. 3 is a top plan view of the apparatus illustrated in FIG. 2.

As shown in FIGS. 2 and 3, support member 42 is basically a ring-shaped device, made from stainless steel or other strong material, adapted to fit in an annular notched shoulder 50 formed in the box end of a pipe section 12B. Shoulder 50 may be provided by milling the box end of the pipe section in which support member 48 rests or, alternatively, may be provided by a special sub. On one side of support member 42 (see FIG. 3) there is an extended section 46 having a slot 48. Support bracket 51 is mounted by welding or other means, colinearly with slot 48. The upper end of wire 40 fits into the slot 48 and support bracket 51 and is restrained from lateral movement by means of a bolt 52 that is mounted in holes in support bracket 51 as shown. Wire 40 has an expansion 54 at its upper end having a diameter wider than bracket 51 to prevent downward movement of the wire and maintain the wire in tension.

Other structures serving the same function as support member 42 will suggest themselves to those skilled in the art. It is desirable that the drill string not be substantially obstructed.

A receiving antenna 43 extends downwardly from the top of the well so that its length substantially overlaps transmitting antenna 40. It is not necessary to use special antenna wire for either the receiving or transmitting antennas. Conducting wire such as teflon coated No. 18 copper clad steel can be employed. This conductor must also be electrically insulated throughout its entire length.

The installation of the apparatus and performance of the method of the present invention is as follows. After drilling has progressed to the point where it is desired to commence wellbore telemetry operations, drilling operations are interrupted and package 21 is lowered into the drill string using conventional techniques with antenna 40 connected to the transmitter antenna terminal thereon. For this operation, a sheave disposed above the derrick floor is normally employed to guide the antenna wire 40 into the wellbore as it is unreeled from a drum. When the instrument 21 is properly seated in the lower end of the drill string 12, preferably in a locking sub immediately above bit 13, the support member 42, if used, is inserted into the annular notched shoulder in the box end of the pipe section as shown in FIG. 2, and the top of antenna 40 is attached to the support member in the manner described above. Receiving antenna 43 is also run into the well to the desired length, which may preferably be nearly the entire length of the well. A weight may preferably be attached to the lower end of antenna 43 to maintain the wire in tension. The two wires, 40 and 43, may be initially lowered into the well simultaneously. Alternatively, instrument package 21 may be positioned within the drill string when drilling commences, or some time later, and conducting wire 40 lowered with a conventional stabbing connector 14 at the lower end thereof for connecting to instrument package 21 when it is desired to begin telemetering operations.

In order to facilitate the addition of pipe sections to the drill string 12 it is preferred that a conductor 43A, comprising the upper portion of the receiving antenna, extend through the interior of kelly 11 as illustrated in FIG. 1 and connect to the upper end of conductor 43.

If telemetry operations are to be performed while the kelly 11 and drilling string 12 are rotating, the upper end of conductor 43A terminates at a device 26 near the upper end of the kelly, capable of conducting the received signal from the rotating member to a stationary member. Device 26 may be a slip ring and brush assembly. Device 26 and electric conductor 27 provide means for transferring signals from the receiving antenna within the drill string and kelly to receiver 28. If telemetry operations are to be performed only at times when the drill string 12 and kelly 11 are stationary, device 26 will not be needed and the conductor 27 may be connected directly to conductor 43A through a suitable connector. In this situation, conductor 27 will be disconnected from conductor 43A when the kelly 11 and drill string 12 are rotated. Other possibilities include connecting a receiving unit to conductor 43A and positioning the receiver on a rotating member; e.g., the kelly 11.

Figure 6:
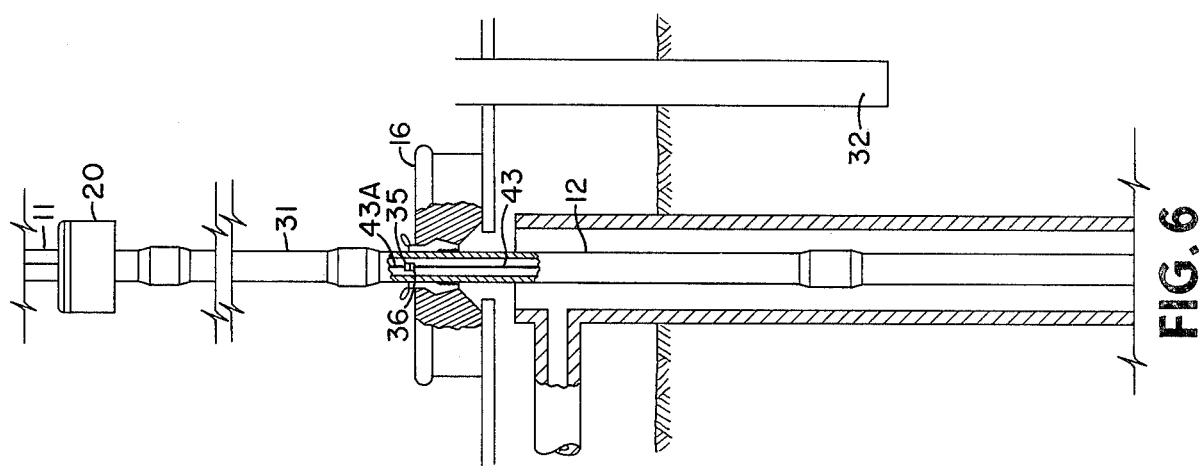
FIGS. 4–6 are schematic views illustrating a preferred sequence of steps for adding a length of drill pipe into the drill string.

Normally, the wellbore is advanced in increments substantially equal to one length of drill string. The procedure for lengthening the drill string will be described with reference to FIGS. 4 through 6. A length of drill pipe 31, to be added to the drill string 12 is shown disposed in a shallow hole 32 ("mouse hole") below the derrick floor.

Figure 5:
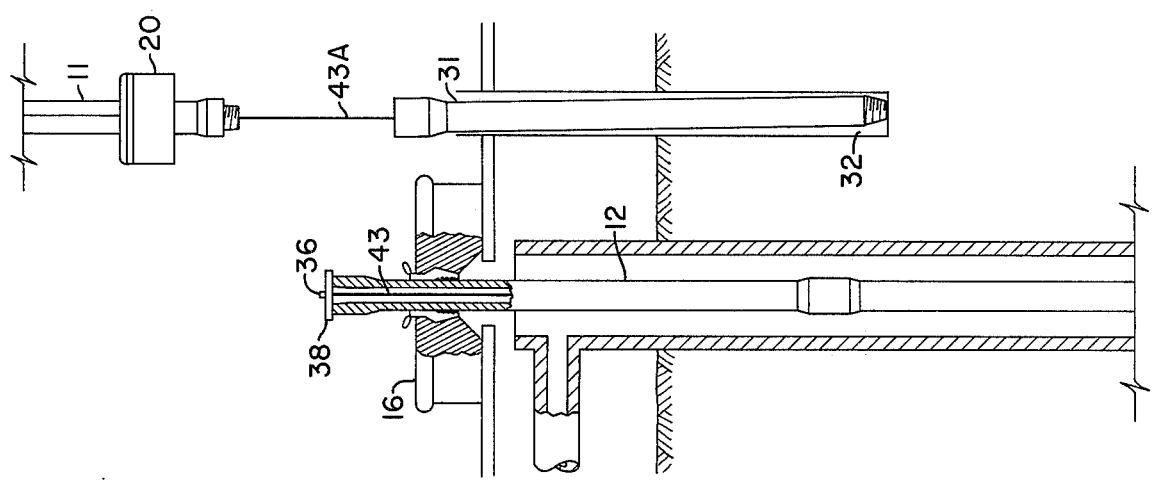
Figure 4:
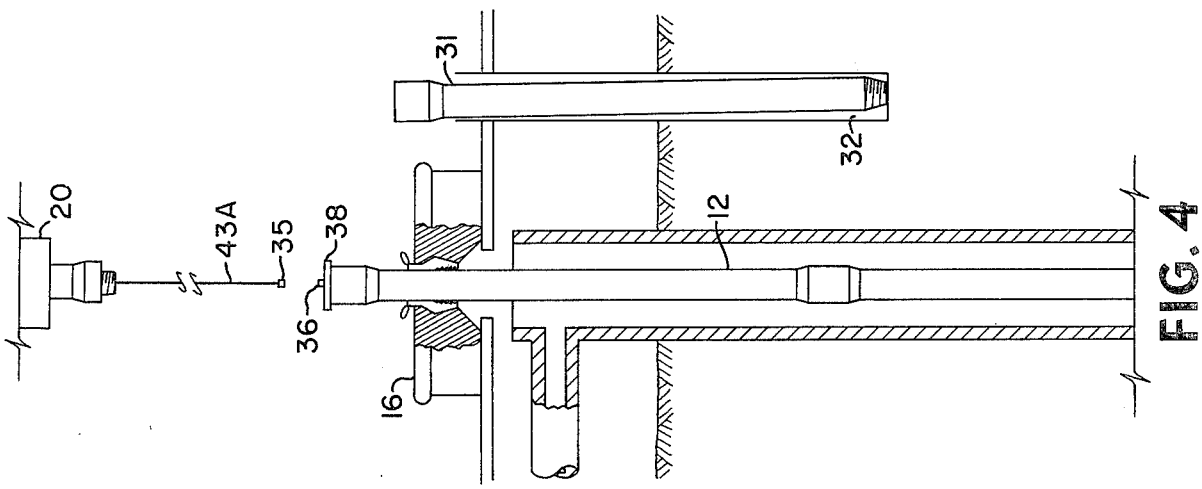

In order to insert the new pipe section, the drill string is initially elevated and suspended on the rotary table 16 and the kelly 11 disconnected from the drill string as shown in FIG. 4. Conductor 43 will normally be connected to conductor 43A by means of connectors 36 and 35 at a distance below the top of the drill string slightly greater than one drill pipe section. The wire must be retracted so that the mated connectors 36 and 35 are above the upper end of drill string 12. A support plate 38 or spider is inserted between the upper end of the drill string and connector 36 and serves to support conductor 43 within the drill string. Connectors 36 and 35 are then separated. FIG. 4 illustrates the position of the equipment at this juncture in the procedure. As shown in FIG. 5, the kelly 11 is then swung over into alignment with pipe length 31 and the length of conductor suspended beneath the kelly is inserted through the new length of drill pipe 31. The kelly 11 is then screwed into the pipe section 31. This assembly is then elevated above the drill string 12 and exposed connector 35 is reconnected with connector 36. After the support plate 38 is removed, the lower end of pipe length 31 is screwed into the drill string 12 and becomes a part thereof. The equipment is then returned to the drilling position and drilling operations resumed.

As drilling operations proceed, pipe sections are added which lengthen the pipe string. As the well is drilled deeper, the transmitting antenna, which retains its original length, will follow the drilling bit down into the well. This means that as the well is drilled deeper, the length of overlap of the transmitting and receiving antennas will diminish. When they cease to overlap the communication link may be broken, and to retain the communication link, it will be necessary to lengthen the receiving antenna to reestablish the overlap. This can be accomplished by retracting the entire receiving antenna 43 and inserting a new longer wire; or more preferably, at a time when a new drill pipe section is being added, a new section of wire having a connector that mates with connector 36 will be connected to the existing receiving antenna and the old section of antenna wire, with the new section attached, lowered into the well to reestablish the desired overlap between the transmitting and receiving antenna.

The invention has been successfully tested in a test well. Good coupling between the two antennas was observed, with a gradual reduction in coupling as the overlap decreased. The tests were conducted with two teflon-insulated, 18-gauge wires inside a drill pipe filled with water, with no attempt to hold the wires together or apart.

We claim:

1. In a method of drilling a well wherein an electrical signal is transmitted between a subsurface location within said well and a location substantially at the surface, the improvement comprising:
    transmitting said electrical signal by means comprising a first insulated conductor, electrically connected to transmitting means at one of said locations and extending through said well a substantial distance toward the other location;
    receiving said electrical signal by means comprising a second insulated conductor extending from said other location through said well a sufficient distance so as to at least partially overlap the first said conductor; and
    lowering the insulated conductor which extends through said well from said subsurface location further into said well, thereby reducing the overlap between said conductors, while continuing to transmit and receive said electrical signal.

2. In a method of drilling a well wherein an electrical signal is transmitted from subsurface locations to a location substantially at the surface, the improvement comprising:
    transmitting said electrical signal by means comprising an insulated electrical conductor functioning as a transmitting antenna, said conductor extending upwardly in said well from a first subsurface location;
    detecting said electrical signal by means comprising a second insulated electrical conductor functioning as a receiving antenna, extending from said location substantially at the surface downwardly into said well so as to at least partially overlap said conductor functioning as a transmitting antenna;
    lowering said insulated conductor functioning as a transmitting antenna within said well to a second subsurface location; and
    transmitting an electrical signal from said second subsurface location.

3. The method of claim 2 wherein said conductor functioning as a transmitting antenna is self standing in said well.

4. The method of claim 2 wherein said conductor functioning as a transmitting antenna extends upwardly within a drill string used for drilling said well and is suspended at its upper end from a support member fixedly positioned within said drill string.

5. A method for establishing and maintaining a communication link between a subsurface location within a drill string and a location substantially at the surface which comprises:
    placing a transmitting device at said subsurface location;
    extending a transmitting antenna upwardly from said device;
    suspending a receiving antenna from said location substantially at the surface downwardly within said drill string, said receiving antenna overlapping a substantial portion of said transmitting antenna; and
    lengthening said drill string while maintaining the lengths of the transmitting and receiving antennas substantially constant.

6. A method of establishing and maintaining a communication link within a well between a first terminal at a subsurface location within said well and a second terminal at a location substantially at the surface which comprises:

lowering a first insulated electrical conductor within said well to said subsurface location;

connecting said first electrical conductor at its lower end to said first terminal;

lowering a second insulated electrical conductor into said well so as to couple electromagnetically with said first electrical conductor;

connecting said second electrical conductor to said second terminal; and lowering said first terminal to a deeper subsurface location while maintaining the lengths of both said insulated electrical conductors substantially constant.

7. A method of establishing and maintaining a communication link within a drill string between a subsurface location within said drill string and a location substantially at the surface which comprises:

lowering a first insulated electrical conductor within said drill string to said subsurface location;

electrically connecting said first electrical conductor at its lower end to a transmitter so that said conductor functions as a transmitting antenna;

lowering a second insulated electrical conductor into said drill string so as to at least partially overlap said first electrical conductor;

electrically coupling said second electrical conductor to a receiver at said location substantially at the surface so that said second conductor functions as a receiving antenna; and lengthening said drill string while maintaining the lengths of said first and second insulated electrical conductors substantially constant.

8. The method of claim 7 wherein said electrical conductors rotate with said drill string and said second electrical conductor is electrically coupled to said receiver by means comprising a slip ring and brush assembly.

9. The method of claim 7 further including the steps of advancing said well sufficiently to require the addition of a length of drill pipe, retracting a portion of said second conductor from said drill string the length of at least one section of drill pipe, inserting said retracted portion of said second electrical conductor through said additional length of drill pipe, and adding said new section of pipe to said drill string.

10. The method of claim 9 further including biasing said second conductor downwardly with a weight attached to the lower end thereof.

11. A method of drilling a well wherein an electrical signal is transmitted from the vicinity of a drill bit connected to the lower end of a drill string used for drilling said well and a location substantially at the surface, the method comprising:

transmitting said electrical signal by means of a transmitter positioned in the vicinity of said drill bit and a first insulated electrical conductor connected to said transmitter and extending upwardly within said drill string so as to function as a transmitting antenna;

receiving said electrical signal by means of a second insulated electrical conductor electrically coupled to a receiver at said location substantially at the surface and extending downwardly within said drill string so as to at least partially overlap said first conductor; and drilling said well deeper while maintaining the lengths of said first and second insulated electrical conductors substantially constant.

12. The method of claim 11 further including adding an additional length of conductor to said second conductor, thereby lengthening said second conductor; and lowering said lengthened second conductor further into said well so as to increase the overlap of said first and second conductors.

13. The method of claim 11 wherein said transmitter is contained within an instrument package that is lowered into position within said drill string with said first conductor connected to said transmitter.

14. The method of claim 11 wherein said instrument package containing said transmitter is positioned within said drill string substantially at the time that drilling operations commence and said first conductor is lowered into position subsequently.

15. The method of claim 11 further including the steps of advancing said well sufficiently to require the addition of a section of drill pipe; disconnecting said drill string at a location substantially at the surface; retracting said second conductor an amount not less than the length of one drill pipe section; inserting the retracted portion of said second conductor wire within a new section of pipe; and, connecting the new pipe section to the drill string.

16. The method of claim 11 further including supporting the first conductor within said well by means of a support member connected within the drill string at the upper end of said first conductor.

17. The method of claim 16 wherein said support member is fixedly positioned within a tool joint of said drill string and said support member is a ring-shaped device that does not substantially obstruct the drill string.

18. A method of transmitting electrical signals in a well between the surface of the earth and subsurface locations which comprises:

lowering a first insulated electrical conductor in said well to a position extending upward from a first subsurface location;

lowering a second insulated electrical conductor in said well to a position extending downward from the surface of the earth and overlapping said first insulated electrical conductor in an electromagnetically coupled relation;

transmitting an electrical signal between said surface location and said first subsurface location through said first and second electrical conductors;

lowering said first insulated electrical conductor in said well to a position extending upward from a second subsurface location to reduce the overlap between said conductors; and transmitting an electrical signal between said surface location and said second subsurface location through said first and second insulated electrical conductors.

19. A method of drilling a well wherein an electrical signal is transmitted between a subsurface location within a drill string having a drill bit connected to the lower end thereof for drilling said well and a location substantially at the surface, the method comprising:

positioning an instrument package containing a transmitter within said drill string substantially at the time drilling operations commence;

lowering a first insulated electrical conductor into said well subsequent to commencing drilling operations;

connecting the lower end of said first conductor to said transmitter so that said first conductor functions as a transmitting antenna;

transmitting said electrical signal from said subsurface location by means of said transmitter and said first conductor connected thereto; and receiving said electrical signal by means of a second insulated electrical conductor electrically coupled to a receiver at said location substantially at the surface and extending downwardly into said well so as to at least partially overlap said first conductor.

20. Apparatus for maintaining a communication link within a well between a transmitter mounted in the vicinity of a drill bit used for drilling said well and the surface as said drill bit drills the well deeper comprising:

A fixed length transmitting antenna extending upwardly within said well and coupled at its lower end to said transmitter so as to travel with said transmitter as said well is drilled deeper; and a receiving antenna suspended from the surface downward into said well to overlap at least a portion of the transmitting antenna, said receiving antenna having a fixed length during at least a portion of the time that said well is drilled deeper.

* * * * *